United States Patent [19]

Ferrante

[11] 4,104,012

[45] Aug. 1, 1978

[54] IMPROVED WIRE STRIPPING APPARATUS

[76] Inventor: Michael R. Ferrante, 9820 S. 50th Ct., Oak Lawn, Ill. 60453

[21] Appl. No.: 731,138

[22] Filed: Oct. 12, 1976

[51] Int. Cl.² .................. M02G 1/12; B29C 17/08
[52] U.S. Cl. ........................... 425/299; 425/302.1; 81/9.51; 81/9.5 A
[58] Field of Search ................. 81/9.51, 9.5 A; 425/302 R, 317, 298, 299

[56] References Cited

U.S. PATENT DOCUMENTS

| | | | |
|---|---|---|---|
| 1,351,186 | 8/1920 | Nelson | 81/9.51 |
| 1,595,793 | 8/1926 | Levinger et al. | 81/9.51 |
| 1,595,799 | 8/1926 | Massingham | 81/9.51 |
| 2,192,056 | 2/1940 | Watts | 81/9.51 |
| 3,309,948 | 3/1967 | Falken | 81/9.51 |
| 3,403,441 | 10/1968 | Eubanks | 81/9.51 X |
| 3,897,617 | 8/1975 | Ackerman et al. | 81/9.51 X |

*Primary Examiner*—Robert L. Spicer, Jr.
*Attorney, Agent, or Firm*—Merriam, Marshall & Bicknell

[57] ABSTRACT

Improved method and apparatus for stripping insulation from the end of the electrical conductor of an insulated wire to expose a predetermined length of the conductor whereby the remaining insulation does not shrink when the wire is subjected to heat. Means, including an improved insulation stripping blade, are provided for compressing the remaining insulation immediately adjacent the exposed end of the conductor and simultaneously heating the remaining insulation immediately adjacent the exposed conductor to cause the adjacent remaining insulation to adhere to the conductor.

8 Claims, 6 Drawing Figures

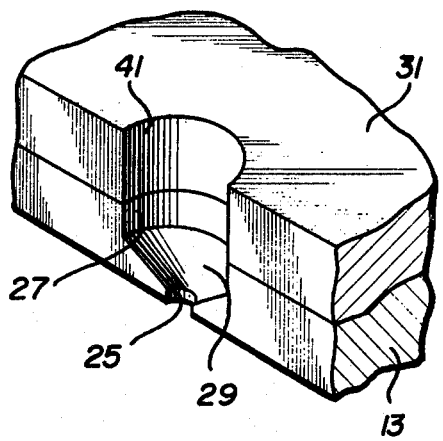
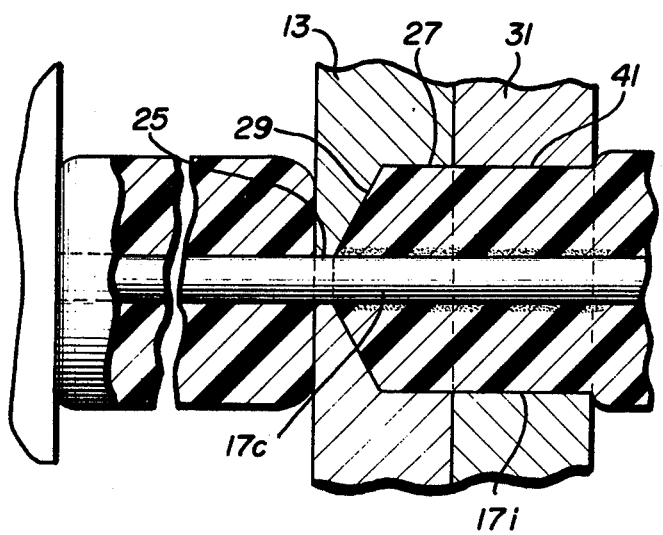
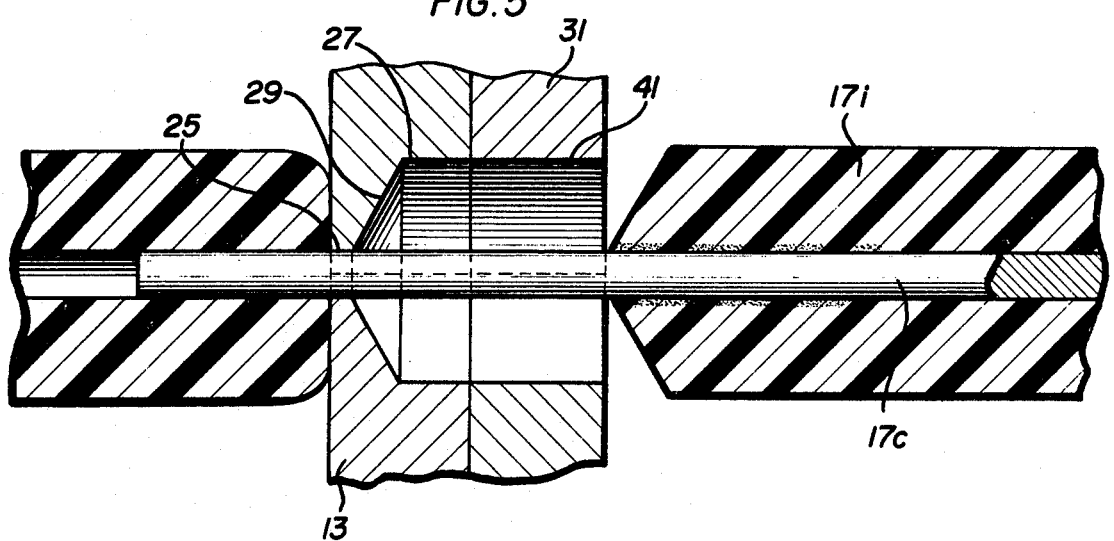
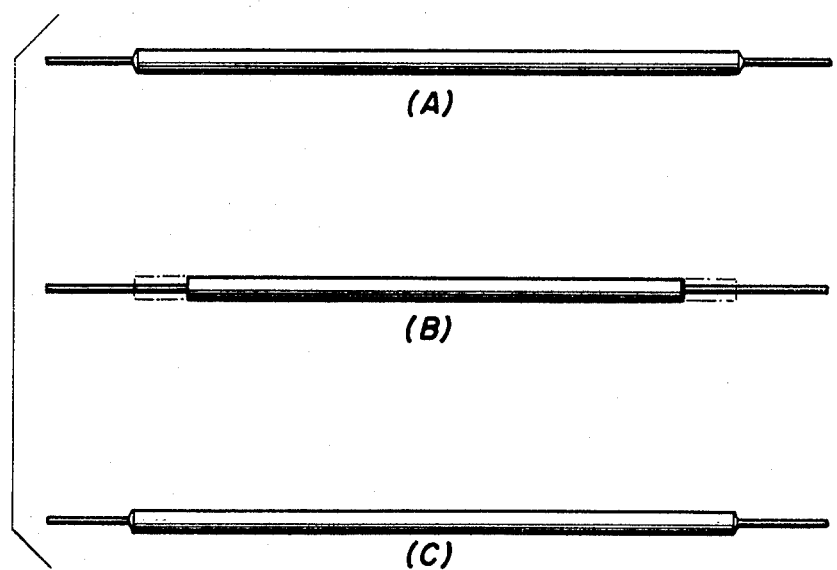

IMPROVED WIRE STRIPPING APPARATUS

This invention relates generally to an improved method and apparatus for stripping electrical insulation from the lead end of an insulated wire and more particularly to the improvement whereby the remaining insulation does not shrink when the wire is subjected to heat during subsequent manufacturing operations or the like.

Insulated hook-up or lead wires are commonly used to interconnect components such as resistors, capacitors, transformers, and the like in electrical circuits. Such wires generally comprise a length of electrical conductor covered by a plastic or rubber insulating material which, in turn, may be covered by a fabric material such as woven cotton. Although the conductor may be a single wire of copper or some other electrically conductive material, alternatively, the conductor may comprise a plurality of smaller gauge wires braided together to form the conductor.

When purchased, and prior to being cut to length and stripped, the insulated wire is usually wound on spools in continuous lengths of several thousand feet. During subsequent manufacturing operations, the insulated wire is pulled from the spool and fed to a wire stripping machine which cuts the insulated wire to a predetermined length and strips a portion of the insulation material from the end of the wire to expose the conductor. These stripped lead wires are then used, for example, to hook up the various electrical components in a circuit.

In many applications the length of the conductor left exposed after stripping is not critical but in certain applications it may be important. For example, where transformers and other components are to be used with printed circuit boards, close tolerances are required, and accordingly, the length of the exposed conductor is critical. Although presently available wire stripping machines can produce lead wires stripped within the requisite tolerances, subsequent manufacturing operations, such as those required in the manufacture of transformers, may result in the length of the conductor left exposed being altered to exceed the maximum allowable tolerance.

In the manufacture of transformers, for example, one end of each of the several lead wires used to connect the transformer in the circuit is connected or soldered to the corresponding internal part of the transformer. After all the assembly operations are completed, the transformer is dipped into a varnish tank and impregnated with varnish to enhance the insulation properties of the transformer and to insure that the internal components are suitably bonded. The transformer must then be baked at a temperature of about 275° F. for at least four hours to set the varnish. When heated, however, many plastic or rubber insulation materials shrink, and accordingly, during the baking operation the insulation material commonly recedes or shrinks back from the end of the lead wire until the length of the exposed end of the wire, although originally within dimensional tolerances, is from 1/16 inch to ½ inch longer and no longer within tolerance. Of course, this is unacceptable when, as here, close tolerances must be maintained. Consequently, the ends of all the wires having lead ends exceeding the maximum allowable length dimension often must be hand clipped. Needless to say, this is a very costly operation.

According to the present invention, there is provided an improved method and apparatus for stripping the insulation from the lead end of an insulated wire whereby the remaining insulation is not susceptible to shrinkage due to heat applied during later manufacturing operations. Wire stripping apparatus generally comprises means for removing the insulation material from the end of the insulated wire to expose a predetermined length of the electrical conductor. The improvement comprises providing means for compressing the remaining insulation at the point immediately adjacent the exposed conductor and simultaneously heating the remaining insulation immediately adjacent the exposed conductor to cause the end of the remaining insulation to adhere to the conductor. Accordingly, when heat is subsequently applied to the insulated wire, any shrinkage of the remaining insulation is minimized.

The features of this invention which are believed to be novel are set forth with particularity in the appended claims. The invention together with its further objects and advantages thereof, may be best understood, however, by reference to the following description taken in conjunction with the accompanying drawings, in which like reference numerals identify like elements in the several figures and in which:

FIG. 3 is an enlarged perspective view of a portion of the cutting edge of the improved insulation stripping blade shown in FIG. 2;

FIG. 4 is a sectional view of the wire stripping apparatus of FIG. 1 illustrating a pair of the improved insulation stripping blades engaging an insulated wire;

FIG. 5 is a sectional view showing the insulated wire being withdrawn from the improved insulation stripping blades to remove the insulation material from the end of the insulated wire; and FIG. 6 shows three lead wires, A, B, and C, and the effect of heat on wires B and C when the wire has been stripped in the conventional manner (wire B) and when the wire has been stripped in accordance with the principles of the present invention (wire C).

DETAILED DESCRIPTION

Figure 1:
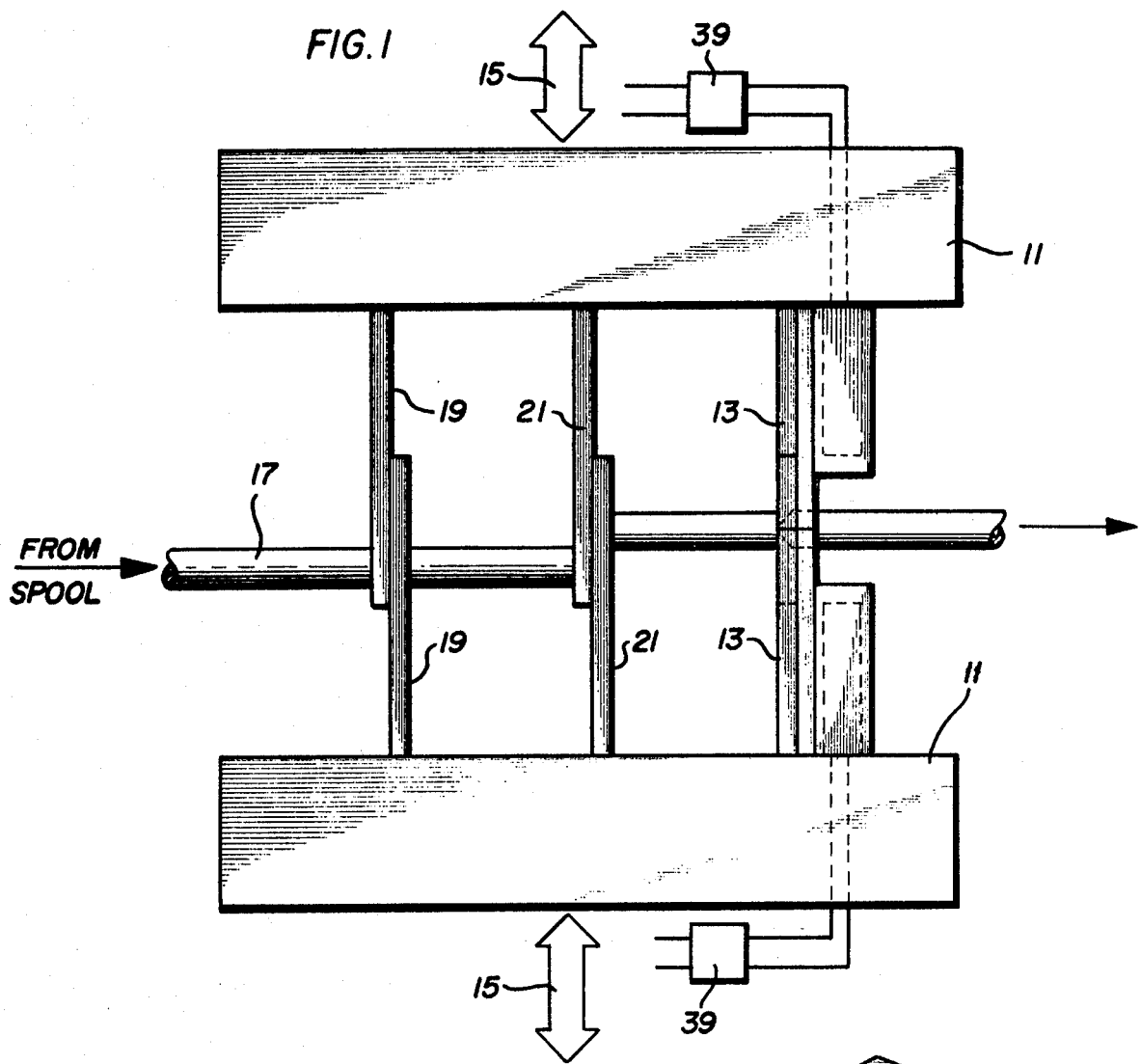
FIG. 1 is a top plan view of a portion of an automatic wire stripper illustrating the utilization of the principles of the present invention in an improved insulation stripping blade.

As illustrated in the embodiment shown in FIG. 1, automatic wire stripping apparatus commonly employ a pair of reciprocating tool holders 11 which periodically transport stripping blades 13 mounted thereon to selectively engage the insulated wire 17 which is to be stripped. In operation, the tool holders 11 reciprocate in opposite directions in the well-known manner, as indicated schematically by the block arrows 15 in FIG. 1, imparting corresponding motion to the stripping blades 13 which are aligned opposite each other on their respective tool holders 11. A support member 19 also extends from each of the tool holders 11 and is transported thereby to engage and support the insulated wire 17 between the tool holders 11 as the wire is pulled from its spool (not shown) during the stripping operation. As the support members 19 engage the insulated wire 17, a pair of cutting blades 21 mounted on the tool holders 11 intermediate the stripping blades 11 and the support members 19 simultaneously sever the insulated wire 17 into lead wires of predetermined lengths. Concurrently, the insulation stripping blades 13 engage the insulated wire 17 to strip away a portion of the insulation from the end of the severed wire as the wire is pulled from the spool and drawn through the wire stripping apparatus.

Figure 2:
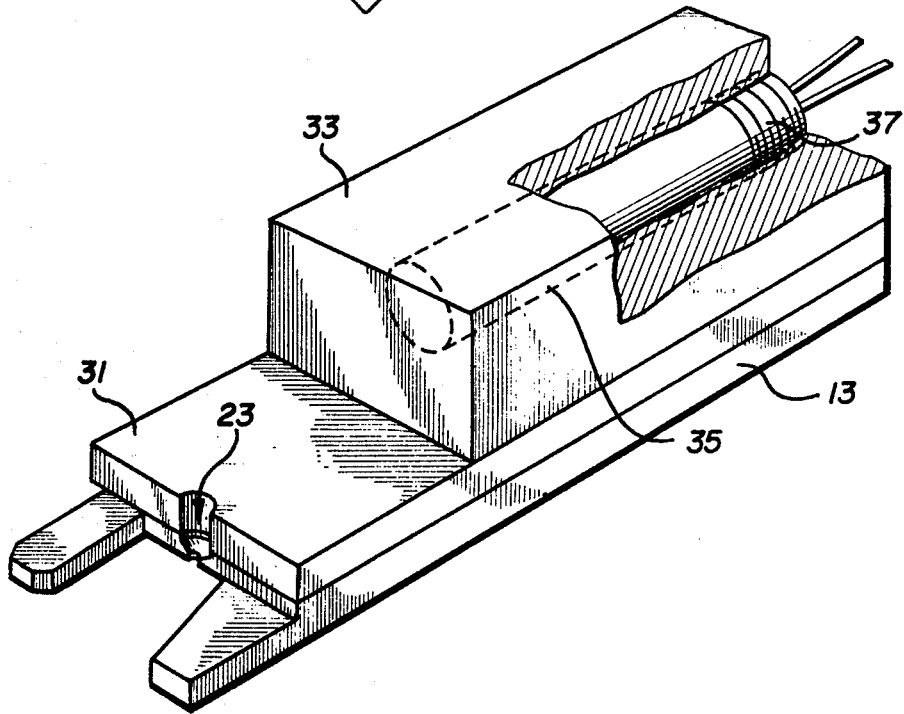
FIG. 2 is a perspective view of the improved insulation stripping blade which has been partially cut away to more clearly show the structure thereof.

Referring now to FIGS. 1-3, inclusive, the improved insulation stripping blade is shown and hereinafter described in more complete detail.

More particularly, each stripping blade 13 comprises a flat, metal plate which butts the leading edge of the other stripping blade whenever the blades engage the insulated wire. Each blade plate 13, in turn, incorporates means in its leading edge for severing the insulation material covering the insulated wire. As illustrated by the embodiment shown generally in FIGS. 2 and 3, the severing means comprises, for example, nonuniform surface channel or notch, identified generally at 23, having three distinct but compound wall surfaces, including a first semi-cylindrical portion 25, a second larger diameter semi-cylindrical portion 27, and a truncated semi-conical portion 29 joining the smaller and larger semi-cylindrical portions 25 and 27, respectively. Accordingly, when the stripping blades 13 close upon the insulated wire 17, the channels 23 in the respective edges of the blades 13 combine to provide a funnellike aperture therethrough. The first portion 25 serves as a cutting edge and is dimensioned to sever the insulation material without nicking or cutting the conductor while the second portion 27 is dimensioned such that the insulation material engaged thereby, although not severed, is substantially squeezed when the blades engage the wire.

In accordance with the principles of the present invention, a heating plate 31 is securely mounted to each of the insulation stripping blades 13 and a heat transfer block 33 having a cavity 35 therein for mounting a heating element 37 is affixed to each of the heating plates 31. Each heating element 37, in turn, is coupled to a respective temperature control unit 39 which permits the selective variation of the temperature of the heating element. In operation, the heat emitted by the heating element 37 is transferred by the heat transfer block 33 to the heating plate 31, which, in turn, heats the stripping blade 13. The heating plate 31, which extends over and is coincident with the stripping blade 13, is notched to provide a groove 41 having a semicircular cross-section in its edge corresponding in size to the larger diameter channel 27 in the edge of the stripping blade 13. Accordingly, when the stripping blades 13 engage the insulated wire, the length of insulation material compressed by the stripping blades 13 and the associated heating plates 31 is substantially greater than would otherwise be accomplished by the blades alone.

Operationally, as may be seen in FIGS. 4 and 5, when the stripping blades 13 engage the insulated wire 17, the smaller diameter cutting edge 25 severs or cuts through the insulation material 17i to separate the insulation which is to be stripped from the conductor 17c from the insulation remaining with the conductor. Simultaneously, the portion of the remaining insulation material immediately adjacent the severed portion is squeezed by the stripping blades 13 and the heating plates 31 mounted thereon while heat is applied to the remaining insulation. The combined effect of the heat and pressure applied to the end of the remaining insulation melts the insulation sufficiently so that the insulation 17i adheres to the conductor 17c at that point. Finally, the conductor 17c is severed by the cutting blades 21 (FIG. 1), and the lead wire is pulled from the wire stripper apparatus. Since the diameter of the stripping blade cutting edge aperture 25 is smaller than the diameter of the severed insulation 17i, the stripping blade 11 slides the severed insulation 17i from the end of the conductor 17c as the wire is being removed from the wire stripper apparatus.

Accordingly, at the completion of the stripping operation, the remaining insulation is, in effect, welded to the conductor at a point immediately adjacent the stripped conductor. The temperature control units 39 permit the amount of heat applied to be varied to accommodate the various insulation materials in use today. It also will be readily understood that the principles of the present invention can be easily adapted to wire stripping apparatus wherein the insulation is burned from the end of the insulated wire to expose the lead end of the conductor.

The practical effect of the adherence of the remaining insulation to the conductor may be appreciated by reference to FIG. 6, In FIG. 6(A), a lead wire which has been stripped in the ordinary manner heretofore commonly used is shown before it is subjected to heat in subsequent manufacturing operations. When heat is applied to the wire, the heat causes the insulation (B) to shrink back from the end of the exposed conductor as illustrated in FIG. 6, and as a result, the length of conductor left exposed is substantially greater than its initial stripped length. On the other hand, as further illustrated in FIG. 6(C), if the wire is stripped in accordance with the principles comprising the improved method and apparatus of the present invention, the insulation adheres to the conductor so that during subsequent operations involving heat, the shrinkage, if any, is minimal.

While a particular embodiment of the present invention has been shown and described, it will be obvious to those skilled in the art that various changes and modifications may be made without departing from the invention in its broader aspects. Accordingly, the aim in the appended claims is to cover all such changes and modifications as may fall within the true spirit and scope of the invention.

I claim:

1. In a wire stripping apparatus having means for removing the insulation from the end of the electrical conductor of an insulated wire to expose a predetermined length of said electrical conductor, the improvement comprising:

means for compressing a predetermined length of said insulation remaining on said electrical conductor immediately adjacent said exposed electrical conductor to secure the predetermined length of said remaining insulation in position on said electrical conductor; and means for simultaneously heating said compressed remaining insulation immediately adjacent said exposed electrical conductor, said compressing means and said heating means cooperating to cause said adjacent remaining insulation to adhere to said electrical conductor along said predetermined length of remaining insulation.

2. The improvement in accordance with claim 1 wherein said insulation removing means comprises blade means for engaging said insulated wire and severing said insulation at a predetermined point along said insulated wire and means for sliding said severed insulation from said electrical conductor to expose said electrical conductor, said blade means incorporating said means for compressing said insulation immediately adjacent said exposed electrical conductor, and wherein said heating means includes means for heating said blade means to heat said insulation.

3. The improvement in accordance with claim 2 wherein said insulation compressing means comprises an aperture extending through said blade means for engaging said insulated wire, said aperture comprising a first portion extending partially through said blade means and a second portion coupled to said first portion and extending through the remainder of said blade means, said first aperture position being dimensioned to sever said insulation whenever said aperture engages said insulated wire and said second aperture portion being dimensioned to compress said insulation without severing said insulation.

4. The improvement in accordance with claim 3 wherein said heating means includes means for compressing and heating said remaining insulation immediately adjacent said blade means.

5. The improvement in accordance with claim 3 wherein said blade means comprises first and second blades, each of said blades having a leading edge aligned to meet the leading edge of the other one of said blades when said blades close, each of said blades having a non-uniform surface channel in said leading edge thereof, said channels being aligned and combining to form said aperture whenever said blades close to engage said insulated wire.

6. The improvement in accordance with claim 5 wherein said heating means comprises first and second plate means, each of said plate means being positioned immediately adjacent and coextensive with a corresponding one of said blades, said heating means further including heat transfer means associated with each of said plate means and heating element means, said heat transfer means conducting heat from said heating element means to said blades through said plate means.

7. The improvement in accordance with claim 6 including means for varying the amount of heat generated by said heating element means.

8. The improvement in accordance with claim 6 wherein each of said plate means has a leading edge aligned to meet the leading edge of the other one of said plate means when said blades close, each of said plate means having a groove in said leading edge, said grooves being aligned and combining to form an aperture through said plate means which is aligned with said aperture through said blades, said plate means aperture being dimensioned to be substantially equal to said second aperture portion of said blades, said plate means aperture compressing said remaining insulation immediately adjacent said blades while simultaneously heating an additional portion of said remaining insulation to cause said additional remaining insulation to adhere to said electrical conductor.

* * * * *